(12) United States Patent
Cortes Gomez

(10) Patent No.: US 8,804,520 B2
(45) Date of Patent: Aug. 12, 2014

(54) CORE NETWORK NODE SELECTION IN A MOBILE COMMUNICATION NETWORK

(75) Inventor: Francisco Cortes Gomez, Würselen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 241 days.

(21) Appl. No.: 13/266,415

(22) PCT Filed: Apr. 30, 2009

(86) PCT No.: PCT/EP2009/055299
§ 371 (c)(1),
(2), (4) Date: Dec. 28, 2011

(87) PCT Pub. No.: WO2010/124740
PCT Pub. Date: Nov. 4, 2010

(65) Prior Publication Data
US 2012/0113809 A1     May 10, 2012

(51) Int. Cl.
*H04L 12/28*     (2006.01)
*H04L 12/16*     (2006.01)
*H04W 40/04*     (2009.01)

(52) U.S. Cl.
USPC ................. 370/235; 455/445; 370/395.21

(58) Field of Classification Search
USPC ................................. 370/235, 338; 709/240
See application file for complete search history.

(56) References Cited

U.S. PATENT DOCUMENTS

| | | | |
|---|---|---|---|
| 2004/0017798 A1 | 1/2004 | Hurtta et al. | |
| 2006/0155873 A1* | 7/2006 | Twata et al. | 709/240 |
| 2007/0147320 A1* | 6/2007 | Sattari et al. | 370/338 |
| 2007/0177525 A1 | 8/2007 | Wijnands et al. | |
| 2008/0250142 A1* | 10/2008 | Magnusson et al. | 709/225 |
| 2009/0190579 A1* | 7/2009 | Witzel et al. | 370/353 |
| 2010/0309784 A1* | 12/2010 | Mihaly et al. | 370/230 |
| 2011/0182227 A1* | 7/2011 | Rune | 370/312 |

FOREIGN PATENT DOCUMENTS

| | | |
|---|---|---|
| EP | 1372306 A2 | 12/2003 |
| GB | 2428942 A | 2/2007 |
| JP | 2002185500 A | 6/2002 |
| JP | 2003534714 A | 11/2003 |
| JP | 2004207851 A | 7/2004 |

* cited by examiner

*Primary Examiner* — Hoon J Chung
*Assistant Examiner* — Yaotang Wang
(74) *Attorney, Agent, or Firm* — Coats & Bennett, P.L.L.C.

(57) ABSTRACT

A method of selecting an interface node of a core network of a mobile communication network for handling data traffic between a mobile device and a destination network or a destination network node, as well a control node for performing such a method are provided. The control node processes signalling traffic for the mobile device and performs the selection. The mobile communication network comprises a plurality of core network interface nodes providing an interface to the core network. An interface node is selected from the plurality of core network interface nodes for handling the data traffic for the mobile device.

17 Claims, 9 Drawing Sheets

CORE NETWORK NODE SELECTION IN A MOBILE COMMUNICATION NETWORK

TECHNICAL FIELD

The present invention relates to a method of selecting an interface node of a core network of a mobile communication network for handling data traffic for a mobile device. The invention further relates to a control node of the core network performing such a selection.

BACKGROUND

Current mobile wireless networks usually comprise a core network with network nodes which handle traffic for a mobile device or user equipment. When a mobile device is setting up or modifying connections, core network nodes for handling the connections generally need to be selected. For example, in an Evolved Packet System (EPS) network, a Serving Gateway (SGW) and a Packet Data Network (PDN) Gateway (PGW) are selected when the mobile device/user equipment (UE) attaches or establishes a new connection to a PDN. A connection modification may for example be the selection of a new SGW if a mobile device moves to a different SGW service area. Corresponding selection mechanisms can be employed in other wireless networks, such as in Global Systems for Mobile communications (GSM), Universal Mobile Telecommunications System (UMTS), Code Division Multiple Access (CDMA), or wide band-CDMA (W-CDMA) networks.

Constrains that limit the selection of these network nodes include for example the ability of the SGW to serve the tracking area, in which the mobile device is located, or the ability of the PGW to provide connectivity to the PDN, with which the mobile device requests to communicate. Similarly, in a GPRS (General Packet Radio Service) core network, the Serving GPRS Support Node (SGSN) may select a Gateway GPRS Support Node (GGSN) which provides connectivity to the network identified by a requested Access Point Name (APN). In general, several core network nodes will meet these constrains. The selection of one of these suitable nodes for handling the connection has a substantial impact on the efficiency of data transport to the mobile device.

A conventional method for selecting an appropriate core network node is described in the 3GPP technical specification 29.303, which can be obtained at http://www.3gpp.org/ftp/Specs/html-info/29303.htm. The method uses the so-called "topological proximity" as a criteria, and bases the selection on the longest-suffix-match of node names. This method is also referred to as "topon" mechanism. The mechanism is based on the naming of EPC network nodes according to a naming scheme that represents a tree structure. Two nodes are considered closer to each other if they share a longer common name "root" or "suffix". As the transport efficiency is generally higher if the network nodes are located closer together, the mechanism may select two network nodes, e.g. an SGW and an PGW, sharing the longest name suffix.

Such a selection mechanism has a fundamental problem, which will be illustrated by the following example. A first SGW may be named "SGW1.region3.west.vfe.mycom.", a first PGW may be named "PGW1.region7.west.vfe.mycom.", and a second PGW may be named "PGW2.north.vfe.mycom.". The mechanism would now select the first SGW and the first PGW, as they share the longer suffix "west.vfe.mycom" compared to the combination of the first SGW and the second PGW. If geographical terms like "north" and "west" are used in the names, this appears to be a good mechanism to judge the proximity between the network nodes. Yet such a mechanism has a major disadvantage. The first SGW may for example be a node in Portland, Oreg. at the USA West Coast, whereas the first PGW may be located in San Diego, Calif., at the USA West Coast. The second PGW may be located in Seattle, Wash., a USA north state. SGW1 and PGW1, which would have been selected by the topon mechanism, have a distance of 1802 miles, whereas SGW1 and PGW2 have a distance of only 176 miles from each other. Such a selection mechanism will accordingly result in an inefficient data transport for the above example. Even if a different name scheme was used, the problem would still be existent at borders of areas or regions of such a naming scheme.

One problem with such a mechanism is that a naming structure and roots based on a longest suffix match can only represent tree like structures. Yet an IP network generally represents a much more complex graph than a simple tree structure. Naming schemes such as the Domain Name System (DNS) are unable to handle the actual topology of an IP network. Nodes located closed to each other may have relatively short matching name suffixes, or nodes located closed to each other with a longer matching suffix may not be directly connected to each other, i.e. may only communicate via other nodes over a longer network path.

Another possibility to overcome the problem mentioned above would be the using of DNS records in combination with information on the GPS coordinates of each node. Even though the geographical distance between two nodes may be minimized that way, node selection may still result in a poor data transport efficiency, as again, the nodes may not be connected directly to each other. The traffic between the nodes may then need to be routed via other nodes and might follow a much longer path than the actual geographical distance between them.

It is desirable to perform the selection of core network nodes so as to enable a higher data transport efficiency. Accordingly, there is a need to improve the selection of a network node for handling data traffic for a mobile device.

SUMMARY

According to an embodiment of the invention, a method of selecting an interface node of a core network of a mobile communication network for handling data traffic between a mobile device and a destination network or a destination network node is provided. The mobile communication network comprises a plurality of core network interface nodes providing an interface to the core network and at least one control node processing signalling traffic for the mobile device. The selection is performed by the control node. According to the method, transport efficiency information stored at the control node is retrieved, wherein the traffic transport efficiency information indicates the efficiency of a transport of data on connections between predetermined network nodes of the mobile communication network. Based on the transport efficiency information, an interface node is selected from the plurality of core network interface nodes for handling the data traffic for the mobile device. The transport efficiency information is dynamically collected and maintained by the control node by means of a routing protocol.

According to a further embodiment of the invention, a control node for selecting an interface node of a core network of a mobile communication network for handling data traffic between a mobile device and a destination network or a destination network node is provided. The mobile communication network comprises a plurality of core network interface nodes providing an interface to the core network. The control node comprises a database adapted to store transport efficiency information indicating the efficiency of a transport of data on connections between predetermined network nodes of the mobile communication network and a selection unit adapted to select an interface node from the plurality of core network interface nodes for handling the data traffic for the mobile device based on the transport efficiency information stored in the database. Further, the control node comprises a routing protocol to dynamically collect and maintain the transport efficiency information.

According to a further embodiment, an electronically readable data carrier with stored electronically readable control information is provided. The control information is configured such that when using the data carrier in a computer system, the control information performs a method according to an embodiment of the present invention.

According to a further embodiment, a computer program product that can be loaded into an internal memory of a computer system is provided. The product comprises software code portions for performing the method according to an embodiment of the present invention when the product is executed.

BRIEF DESCRIPTION OF THE DRAWINGS

The foregoing and other features and advantages of the invention will become further apparent from the following detailed description read in the conjunction with the accompanying drawings. In the drawings, like reference numerals refer to like elements.

DETAILED DESCRIPTION

Figure 1:
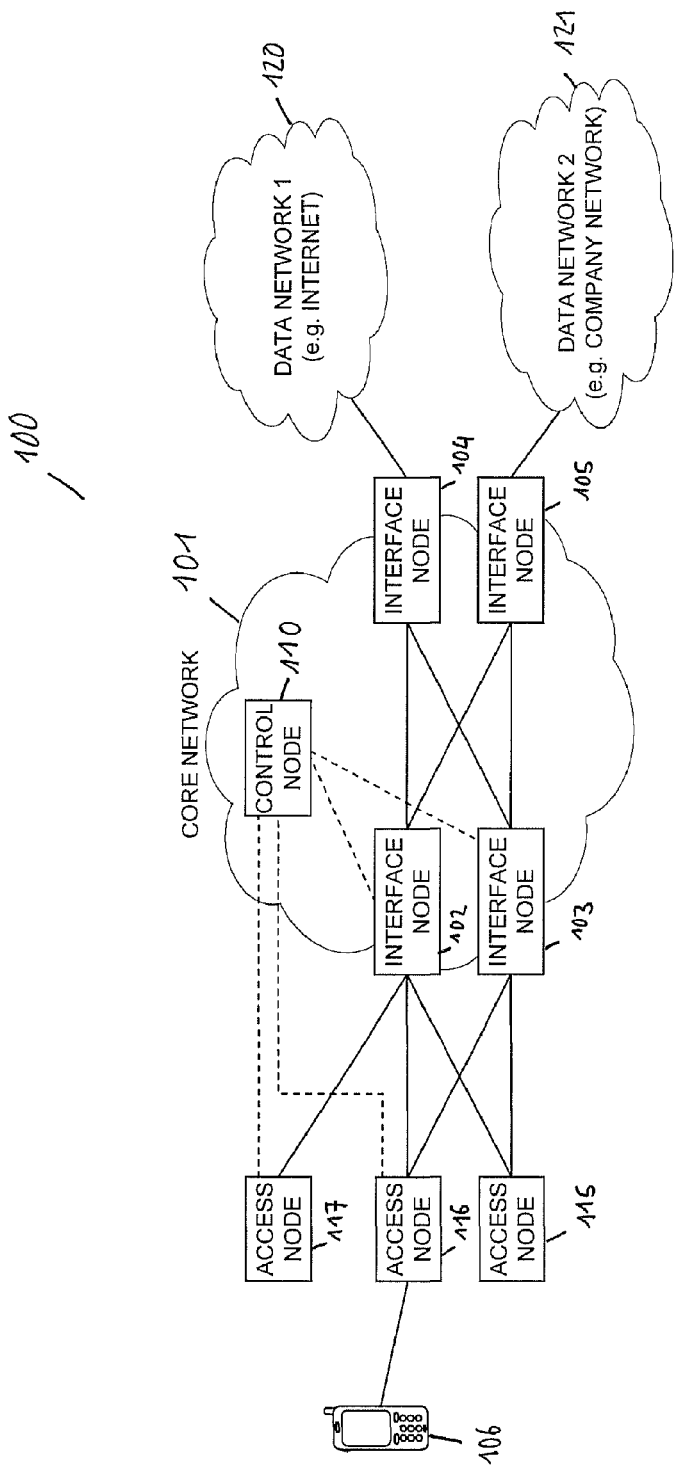
FIG. 1 schematically illustrates a mobile communication network with a core network comprising a control node according to an embodiment of the invention.

In the following, the invention will be explained in more detail by referring to exemplary embodiments which relate to methods and control nodes for selecting an interface node of a core network of a mobile communication network for handling data traffic between a mobile device and a destination network or a destination network node.

According to an embodiment, the mobile communication network comprises a plurality of core network interface nodes providing an interface to the core network and at least one control node processing signalling traffic for the mobile device, the selection being performed by the control node. Transport efficiency information stored at the control node is retrieved, wherein the transport efficiency information indicates the efficiency of a transport of data on connections between predetermined network nodes of the mobile communication network. Based on the transport efficiency information, an interface node is selected from the plurality of core network interface nodes for handling the data traffic for the mobile device. The transport efficiency information is dynamically collected and maintained by the control node by means of a routing protocol. By basing the selection of the interface nodes on the transport efficiency information, a node can be selected that is capable of providing the most efficient transport of data to the mobile device. The transport efficiency information may be provided for connections towards the interface nodes selectable by the control node. The data transport from the mobile device towards the interface nodes and from the interface node towards the destination may thus be improved.

The step of selecting the interface node may comprise a determining of a data path from an access node of the mobile communication network providing connectivity to the mobile device to the destination network or destination network node, respectively, having a maximum transport efficiency for said data. The data path may comprise at least one core network interface node. The at least one core network interface node comprised in the determined data path may then be selected for handling the data traffic for the mobile device. The data path may of course also comprise further interface nodes, which may also be selected. An access node may be a node of the mobile communication network not comprised in the core network, e.g. a node of a radio access network, such as an eNodeB, a NodeB, a Radio Network Controller (RNC), or a node of a Base Station Subsystem (BSS), such as a Base Transceiver Station (BTS), a Base Station Controller (BSC), or the like.

As an example, the transport efficiency information may be provided in the form of path costs associated with connections between said predetermined network nodes, and a search method may be used for finding the path which minimizes the associated costs. This may result in a very efficient selection of an interface node, so as to maximize the data transport efficiency for the mobile device.

The selected interface node may establish a connection towards the mobile device upon selection and may continue to handle data traffic for the mobile device until the connection is terminated. This may be the case when the mobile device terminates the connection or triggers a selection of a new interface node by the control node. The interface node is thus not only selected for routing a particular message or data packet, but for handling the connection towards the mobile device.

The routing protocol employed by the control node may be IP (Internet Protocol) based. As an example, the routing protocol may be selected from a group comprising an Open Shortest Path First (OSPF) protocol, an Intermediate System to Intermediate System (IS-IS) protocol and a Border Gateway Protocol (BGP). The transport efficiency information may also comprise Multiprotocol Label Switching (MLPS) path information obtained via label distribution protocols. The above routing protocols may be capable of dynamically collecting and maintaining the state of connections between the predetermined network nodes. The routing protocol may be deployed as a dedicated routing protocol, which is dedicated for the collection of the transport efficiency information. The collection of the transport efficiency information may thus be the sole purpose of the routing protocol. This may enable a flexible deployment of the routing protocol and may avoid interference with or modifications of existing routing protocols. It is also possible to use a routing protocol already deployed in the mobile communication network, such as an IP routing protocol, for collecting the transport efficiency information.

The mobile communication network may comprise plural access nodes providing access to the mobile device, and plural core network interface nodes in form of access interface nodes providing an interface towards said access nodes, and gateway nodes providing an interface towards remote networks or remote network nodes. The routing protocol may be operated on the access nodes, the access interface nodes, the gateway nodes, and the control node. The network nodes operating the routing protocol may be comprised in the same network area or the same virtual network of the routing protocol. This may ensure that the data path providing the most efficient data transport can be found. By being comprised in the same network area or logical/virtual network, the network nodes operating the routing protocol may obtain a full picture of all the network, instead of only a partial picture of the subnetwork they are located in. Further, if the nodes would be comprised in different areas or different virtual networks, the data path may always pass along a particular router or backbone between these areas or virtual networks, which may result in an inefficient data transport. Examples of access interface nodes comprise a SGSN or an SGW, whereas examples of gateway nodes comprise a GGSN or an PGW.

The control node may be implemented with an interface node, so as to process both user data and signalling traffic, e.g. in an SGSN. On the other hand, the control node may also be adapted to process signalling traffic for the mobile device, and may not comprise a user data routing functionality, such as an MME.

The selection of the interface node may be performed by a Node Selection Function (NSF) of the control node using a first type of network node identifier for identifying the interface nodes, wherein the retrieving of the transport efficiency information may be performed by a Network Information Function (NIF) of the control node using a second type of network node identifier for identifying the interface nodes. The first and the second type of network node identifier may then be correlated to enable the node selection function to use the transport efficiency information for selecting the interface node. Another possibility may be the usage of the same network node identifiers by the NSF and the NIF.

The transport efficiency information may comprise at least one of connection speed, connection bandwidth, connection congestion, connection load, maximum reservable connection bandwidth, unreserved connection bandwidth, available connection bandwidth and optical transport specific constraints for a connection. Using one or more of these properties for selecting the interface node may result in an improvement of data transport efficiency compared to conventional node selection mechanisms. These connection properties may be collected and dynamically updated by a routing protocol, which may comprise a protocol extension, such as a traffic engineering extension.

From the plurality of core network interface nodes of the mobile communication network, a number of core network interface nodes may further be chosen in accordance with predetermined constraints to generate a candidate list of core network interface nodes. The interface nodes for handling the data traffic for the mobile device may then be selected from the candidate list. This may ensure that the selected interface node is capable of providing the required services to the mobile device, such as the ability to serve a particular tracking area, to provide connectivity to a particular remote or external network, or the like.

The selection of the interface node may be performed in response to: an attachment request by the mobile device; the mobile device moving to a new cell of the mobile communication network, thereby triggering a procedure for a selection of a new core network interface node at the control node; the user terminal requesting a connection to a different destination network or destination network node accessible via one or more core network interface nodes different from the interface nodes currently connected to the mobile device; or an area update request from a mobile device.

According to an example configuration, the control node may be a Mobility Management Entity (MME) and the mobile communication network may be an Evolved Packet System (EPS) network comprising plural eNodeBs as access nodes providing connectivity to the mobile device, and plural core network interface nodes in form of Serving Gateways (SGWs) and Packet data network Gateways (PGWs).

According to another configuration, the control node may be a serving GPRS Support Node (SGSN), and the core network may be a General Packet Radio Service (GPRS) core network comprising plural core network interface nodes in form of Serving GPRS Support Nodes (SGSNs) and Gateway GPRS Support Nodes (GGSNs). Different types of access nodes may be used with such a core network, such as nodes of a Radio Network Subsystem (RNS), a Base Station Subsystem (BSS), or other types of radio access networks, e.g. of CDMA or CDMA2000 networks. In other configurations, the core network interface nodes may also comprise Packet Data Serving Nodes (PDSNs) of a CDMA network.

It should be clear that these are only example network configurations, and that the invention may also be applied to other types of mobile communication networks.

In an embodiment of the control node according to the invention, the control node is configured to perform any of the methods mentioned above. Such a control node may achieve advantages similar to the ones outlined above.

It is to be understood that the features mentioned above and those yet to be explained below can not only be used in the respective combinations indicated, but also in other combinations or in isolation, without leaving the scope of the present invention.

FIG. 1 shows a mobile communication network 100 comprising a plurality of core network interface nodes 102 to 105 providing an interface to the core network 101. Network 100 may be an IP-based network. A control node 110 according to an embodiment of the invention is provided for selecting an interface node of the core network 101 of the mobile communication network 100 for handling data traffic between a mobile device 106 and a destination network 120 or 121 or a destination network node. Control node 110 comprises a database adapted to store transport efficiency information indicating the efficiency of a transport of data on connections between predetermined network nodes of the mobile communication network 100 and a selection unit adapted to select an interface node from the plurality of core network interface nodes 102 to 105 for handling the data traffic for the mobile device 106 based on the transport efficiency information stored in the database. Control node 110 may thus be enabled to select an interface node for the mobile device 106 that is capable of providing a high data transport efficiency. The mobile device 106 may be a user terminal such as a mobile phone, a handheld communication device, a Personal Digital Assistant (PDA), a portable media player, a portable computer or the like.

The control node 110 may be adapted to perform the selection of the interface node by determining a data path from an access node 116 of the mobile communication network 100 providing connectivity to the mobile device 106 to the destination network 120 or 121 or destination network node having a maximum transport efficiency for said data, the data path comprising at least one core network interface node 102 to 105. The control node 110 may then select the at least one core network interface node comprised in the determined data path for handling the data traffic for the mobile device.

As an example, mobile device 106 may wish to connect to data network 120, e.g. the internet. Control node 110 may now determine a data path from access node 116 to interface node 104 which provides access to data network 120. If the transport efficiency information indicates a slow data transport between interface node 102 and interface node 104, e.g. due to a low bandwidth connection, the data path having a maximum transport efficiency may run trough interface node 103. Interface node 103 may then be selected by control node 110 to handle traffic for mobile device 106, i.e. to establish a connection towards mobile device 106. There may be more interface nodes available in core network 101 providing an interface to data network 120, and control node 110 may accordingly also select the interface node towards the data network lying on the most efficient data path. Please note that although a control node 110 is drawn as a node separate from interface nodes 102 to 105, it may also be implemented with one of these nodes.

Control node 110 comprises a routing protocol to dynamically collect and maintain the transport efficiency information. As an example, the mobile communication network 100 comprises plural access nodes 115 to 117 providing access to the mobile device 106, and plural network interface nodes 102 to 105 in form of access interface nodes 102 and 103 providing an interface towards the access nodes 115 to 117, and gateway nodes 104 and 105 providing an interface towards remote networks 120 and 121 or remote network nodes. The routing protocol may be provided on the access nodes 115 to 117, the access interface nodes 102 and 103, and the gateway nodes 104 and 105. The network nodes being provided with the routing protocol may be comprised in the same network area or the same virtual network of the routing protocol. For example control node 110, interface nodes 102 to 105 and access nodes 115 to 117 may be comprised in the same network area of the routing protocol. To achieve this, the routing protocol may be a dedicated routing protocol being dedicated for the collection of the transport efficiency information. Other routing protocols employed in mobile communication network 100, for example used for routing user data or signalling traffic, may divide the network 100 into different areas, and the interface nodes and the access nodes not being comprised in the same network area may prevent the finding of the most efficient data transport path. The protocol may further be provided on intermediate nodes (not shown) between the nodes mentioned above, such as on routing nodes and the like.

Routing protocols that control node 110 may employ for collecting the transport efficiency information comprise the OSPF protocol, the IS-IS protocol and the BGP protocol. It may also employ MPLS path information obtained via label distribution protocols.

Network 100 may be an IP based network. It may for example be an Evolved Packet System (EPS) network, a Global System for Mobile communications (GSM) network, a GPRS network, a Universal Mobile Telecommunications System (UMTS) network, a CDMA, CDMA2000 or WCDMA network, a Tetra network or the like. It may for example have one of the network configurations mentioned above.

Figure 2:
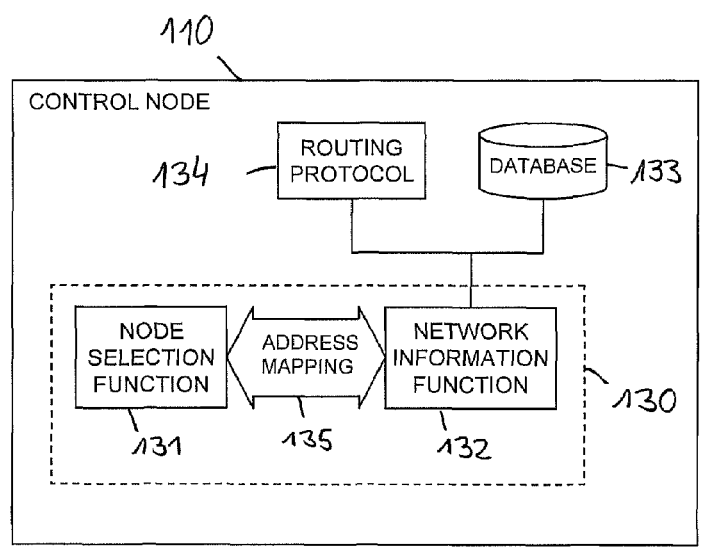
FIG. 2 schematically illustrates a control node according to an embodiment of the invention.

An example configuration of control node 110 is shown in FIG. 2. Control node 110 comprises a selection unit 130 for performing the selection of an interface node and a database 133 storing transport efficiency information for connections between predetermined network nodes of the mobile communication network 100. The predetermined network nodes may not only comprise interface nodes and access nodes, but also intermediate nodes such as routing nodes, as will be shown later. Routing protocol 134 may be a link state routing protocol like OSPF or IS-IS and may create and maintain the link state database 133. Control node 110 may thus obtain a complete picture of the IP network infrastructure within its OSPF or IS-IS area. Routing protocol extensions for traffic engineering, such as RFC3630 and draft-ietf-isis-ipv6-te-05.txt may be used with these routing protocols, and may provide additional information which can be used for determining the most efficient data path. Other protocols that may be used include the BGP or label distribution protocols for obtaining MLPS path information.

Selection unit 130 comprises a node selection function 131 and a Network Information Function (NIF) 132. NIF 132 controls the collection of information on the network infrastructure connecting the relevant nodes and relates this information with the actual nodes to be selected by the control node. It retrieves the transport efficiency information from database 132 and may perform the determination of the most efficient data transport path. To relate the collected information to the interface nodes, it may further perform an address mapping indicated by reference sign 135. Node selection function 131 decides which core network interface nodes to use for each connection. It may generate a list of candidate nodes in accordance with constraints, from which an interface node can be selected. The constraints restrict the nodes that are available for selection, e.g. due to the network topology. Examples of constraints are: an SGW should be selected that is able to serve the tracking area in which the mobile device is located, a PGW should be selected which provides connectivity to an APN requested by the mobile device (EPS network), or a GGSN should be selected which provides connectivity to the requested APN (GPRS network). The selection unit may use the topology information on the mobile communication network collected by the NIF to select an interface node that optimizes the transport efficiency.

Other implementations of the functional blocks or units shown in FIG. 2 are of course also possible, the NIF 132 may for example comprise routing protocol 134 and database 132. It should be appreciated that the partitioning into functional blocks or units shown in the drawing is not to be construed as indicating that these units are necessarily implemented as physically separate units. They may be implemented as separate units, circuits or chips, but may also be implemented in a common circuit, chip, or unit. Routing protocol 134 and selection unit 130 may for example be implemented as software running on a microprocessor, whereas database 133 may be stored in a memory, such as a random access memory, a hard drive, a flash memory or the like.

Figure 3:
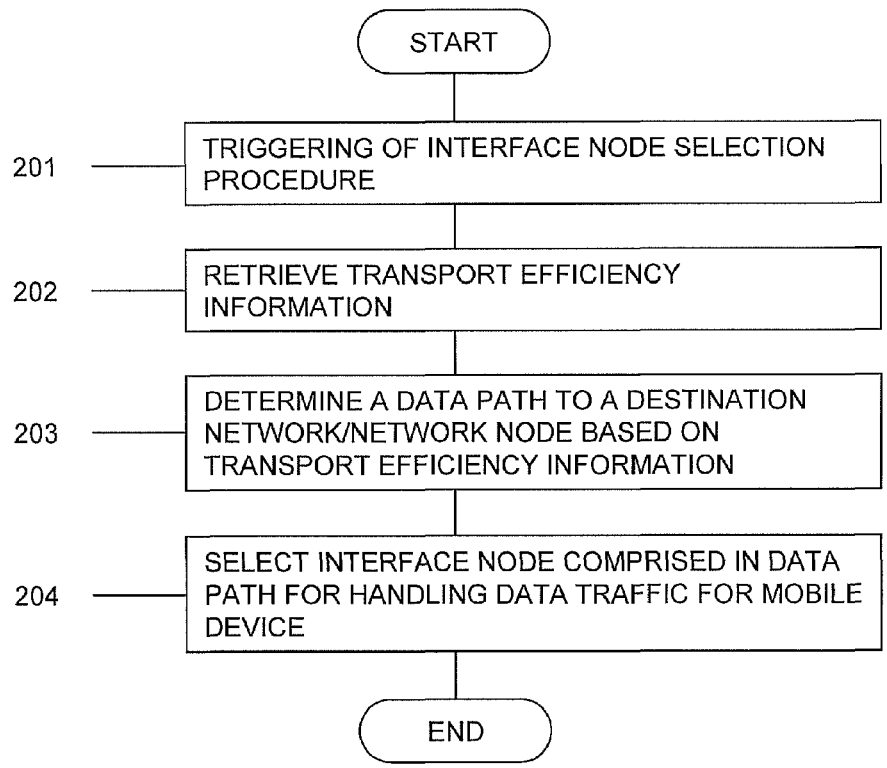
FIG. 3 is a flow-diagram of a method according to an embodiment of the invention.

An example of a method that may be performed by control node 110 is illustrated in the flow-diagram of FIG. 3. In a first step 201, an interface node selection procedure is triggered at the control node 110. The triggering may occur by receiving signalling messages at the control node, e.g. when the mobile device 106 sends a request to attach, connects to a new access node or requests the connection to a new data network. The control node retrieves transport efficiency information in step 202. Based on the retrieved transport efficiency information, the control node determines a data path to a destination network or destination network node having the highest data transport efficiency (step 203). As in the above example, this may be the path from access node 116 to interface node 104 via interface node 103. An interface node comprised in the data path is then selected by the control node for handling data traffic for the mobile device (step 204). Interface node 103 may thus be selected.

A specific example for an implementation for control node 110 will now be described with respect to FIG. 4. While in the following, reference will be made to an evolved packet system network as an example, it should be noted that this explanation is clearly non restrictive for the present invention and that any type of mobile communication network is covered by the present invention, such as a GPRS network and the like. The explanations given below are thus equivalently applicable to any other mobile communication network.

For performing the node selection based on the transport efficiency information, the Node Selection Function (NSF) and the Network Information Function (NIF) correlate the node identities using an address mapping. In the 3GPP EPS example, the NSF is located in a control node in form of the MME, and uses Fully Qualified Domain Names (FQDNs) to identify network nodes, as defined in 3GPP TS 29.303 and 3GPP TS 23.003. It may also use other identifiers available to the MME, such as an MME Group Identifier (MMEGI) or an MME Code (MMEC) to identify an MME, or eNodeB specific identifiers.

The NIF may use routing protocol dependent identifiers. These may be "router IDs" in the case of an OSPF routing protocol (e.g. a public IPv4 @ assigned to a loopback interface), or "system IDs" in the case of IS-IS (6 Bytes which can be assigned in different ways), or other identifiers for other protocols. In addition, other information can also be used by using protocol extensions, like those extensions already existing for traffic engineering purposes that were mentioned above, or other extensions.

For correlating the two sets of network node identifiers, the routing protocol used for collecting the transport efficiency information may use an extension carrying the FQDN together with the routing-protocol-identity for routing information applicable to EPC nodes. The FQDNs can thus be correlated to the routing protocol identifiers.

As another example, the routing protocol may not carry an additional identifier, and the NSF may use a Domain Name System (DNS) to map the FQDN to a routing protocol specific identity. For instance, an A/AAAA record mapping procedure may map an FQDN like "NF-identity.gw7.region7.west.vfe.mycom" into the IPv4 address used by "gw7.region7.west.vfe.mycom" as OSPF "router-ID". For eNodeBs, a DNS record mapping to a similar FQDN derived from the eNodeB identifier can be used.

Another possibility is to ensure that the routing protocol process used by the NIF includes the actual traffic IP addressed used by the involved nodes and interfaces. For example the traffic IP addresses used by the SGW for S1-U, S11, S5 and S8 interface networks, the traffic IP addresses used by the PGW for S5 and S8 interface networks, the eNodeB IP addresses used for S1-U and the like.

This has the advantage that no additional DNS records are needed than those already required by 3GPP TS 29.303, but it increases the complexity of the network-graph and of the selection process. The NSF would need to apply the whole sequence of DNS queries for each of the candidate nodes in order to get the final A/AAAA records for all of them. One and the same node will probably have different IP addresses for each interface, and multiple IP addresses for one and the same interface.

Even so, there is generally routing information available to the network on how to reach all these traffic IP addresses, and routing processes can be used to maintain this information.

On the other hand, the node containing the NIF may not be involved in the user plane and may not be involved in those routing protocols. For example, an MME is usually not involved in any routing process handling the S1-U or S5/S8 network domains, as shown in FIG. 4. Further, an optimal node selection may use information from different interfaces, for which different routing protocols are used for the actual traffic routing. In the example of EPS, for the MME to optimally select an SGW and a PGW under consideration of the current eNodeB, it is advantageous if the NIF has a full network-graph including the eNodeB and SGW endpoints on S1-U and the SGW and PGW endpoints on S5/S8, but the S1-U and the S5/S8 networks are likely to be logically independent and handled by different routing process in the SGW. These problems may be overcome by setting up a dedicated routing protocol in the network nodes that are to be considered during selection.

In particular, it is advantageous to set up the selected routing protocol in at least all the EPS nodes liable to be selected by the NSF. This can be limited to those nodes, or it can be extended to the IP infrastructure in between.

An already existing routing process in those nodes, used for normal IP routing purposes could be leveraged for the purposes of providing the transport efficiency information.

In another implementation, the NIF may use an additional routing process, or at least, heavily influence how a routing process is to be setup in order to fulfil both the purposes of node selection optimization and "normal" IP routing.

According to an implementation, the routing protocol/configuration may be adapted to differ from an independent routing protocol for IP routing purposes only. The collected routing information can contain a complete picture of the network connecting all applicable EPS nodes. For a classical link-state routing protocol this means that all nodes should be in the same "routing area". An IP-routing-only routing protocol for a PLMN is likely to divide the network into a backbone and a number inter-connected routing areas, which would result in simplified/summarized views of the network by individual nodes.

The collected routing information can reflect information on the IP routing for the actual traffic carried by the connections that the EPS nodes will be handling. A PLMN may define specific "Virtual Private Networks", VPNs (using VLAN technology, BGP-MPLS VPNs, . . . ) for different types of traffic. The NIF can collect topology information applicable to those VPNs that will carry the actual traffic, the transport efficiency of which is to be optimized.

For many types of network deployments, the NIF might not require a complete picture of the IP network, including all purely IP-transport infrastructure. It might be sufficient to use an "overlay" network where the EPS nodes relevant for the selection optimization are connected peer-to-peer via tunnels (IPinIP, GRE, IPSec, . . . ) and are the only ones involved in the routing process used by the NIF.

Depending on the mechanism chosen for the correlation of NIF collected information with the node-identities known to the NSF, additional parameters carried by the routing protocol may be configured for this purpose only.

The NIF may collect information not only on Core Network nodes (like MME, SGW and PGW in the EPS), but also on other nodes relevant for an optimal selection (like eNodeBs in EPS). This might imply different VPNs, which might be handled by different routing processes or even different routing protocols in an underlying IP network design.

Figure 4:
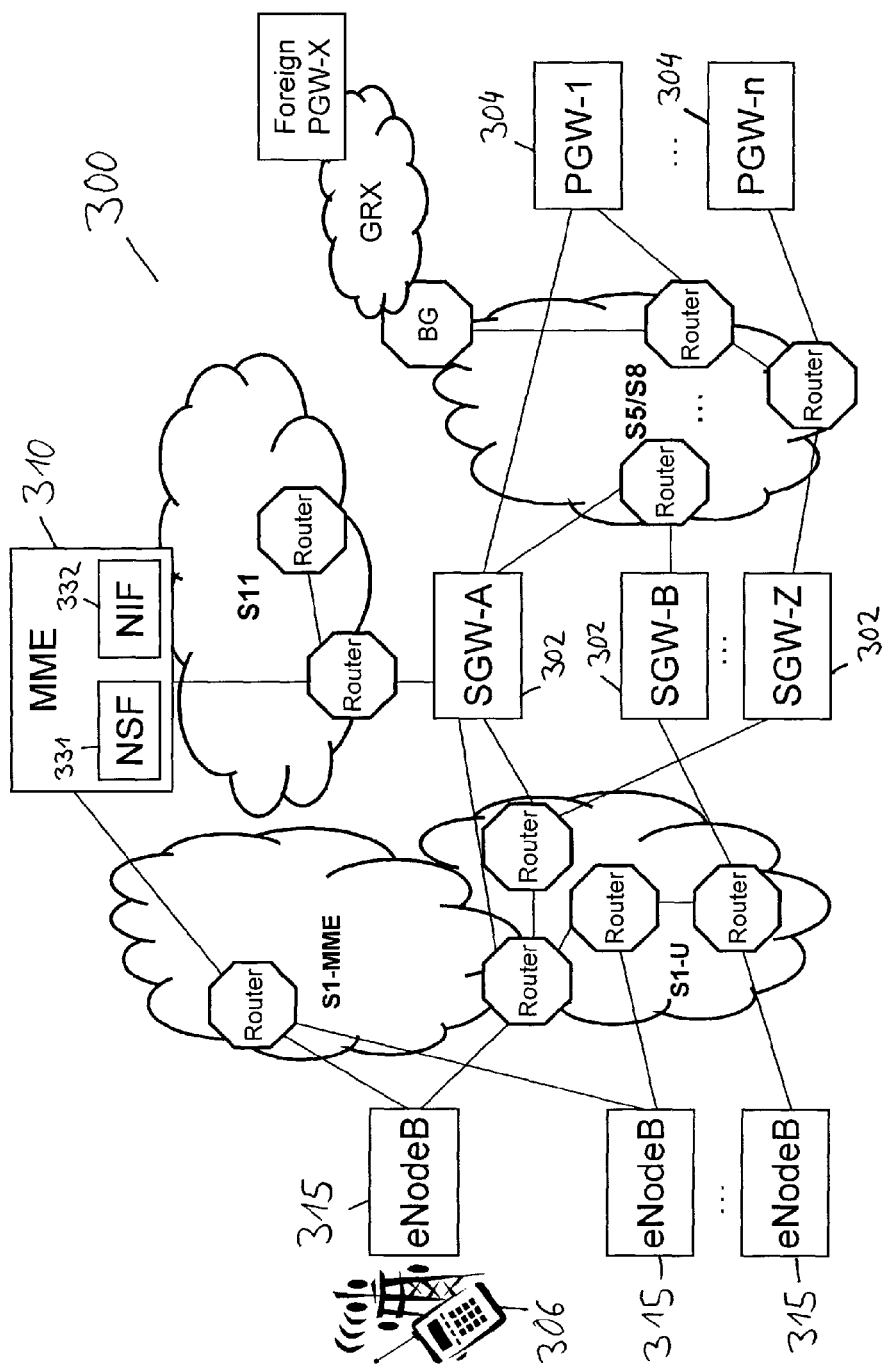
FIG. 4 is a schematic diagram illustrating an evolved packet system network with a control node in form of a mobility management entity according to an embodiment of the invention.

An example of a simplified EPS network with the nodes relevant for the selection process is schematically illustrated in FIG. 4. In the Figure, the octagonal boxes represent IP infrastructure nodes, such as routers and a Border Gateway (BG), which may be involved in the routing process used by the NIF. The EPS network comprises MME 310 as a control node, and plural SGWs 302 and PGWs 304 as core network interface nodes. ENodeBs 315 are provided as access nodes providing connectivity for the mobile device 306. Furthermore, the Figure illustrates networks (clouds) comprising intermediate nodes that interface the relevant network nodes. The naming of these interfaces is known to the skilled person and is described in the corresponding 3GPP references.

In the following, an example is given on how an NIF specific routing process may be setup in the EPS network 300 of FIG. 4. For the example configuration, an OSPF protocol without additional extensions is used. The eNodeBs can run their own OSPF processes. Additional DNS A/AAAA records indexed with "NIF-identity.<eps-node-name>" can be used to map SGW and PGW FQDNs to the OSPF router IDs (NIF identity) used by the NIF routing process. Furthermore, additional DNS A/AAAA records indexed with "NIF-identity.<eNodeB-ID-derived-FQDN>" can be used to map eNodeB identifiers to the OSPF router IDs used by the NIF routing process. In this example, the selection optimization is used in non-roaming cases, yet an extension to roaming cases is also possible, as will be described later.

MME 310, which contains the actual NIF 332, SGWs 302, PGWs 304 and eNodeBs 315 may be provided with an additional OSPF routing process for collecting the transport efficiency information. Furthermore, intermediate IP routing equipment, such as the routers shown in FIG. 4, may also be provided with the additional OSPF routing process, which may further improve the node selection. If not all IP routing equipment is provided with the routing process, improvements in node selection can still be achieved.

The following routing information can be obtained by the routing processes and may be announced by the corresponding nodes in form of Link State Advertisements (LSAs):
One interface per SGW link on S1-U or S5. The SGW can use the same router-ID as provisioned in the DNS record at "NIF-identity.<sgw-name>". The interfaces do not require a real traffic IP address to be used. Unnumbered links may be used.
One interface per PGW for each link on S5. The SGW can use the same router-ID as provisioned in the DNS at "NIF-identity.<pgw-name>".
One interface per eNodeB for each link on S1-U. The eNodeB can use the same router-ID as provisioned in DNS.
The metric on those interfaces matching the metrics used for S1-U or S5 payload traffic as applicable.

Figure 5:
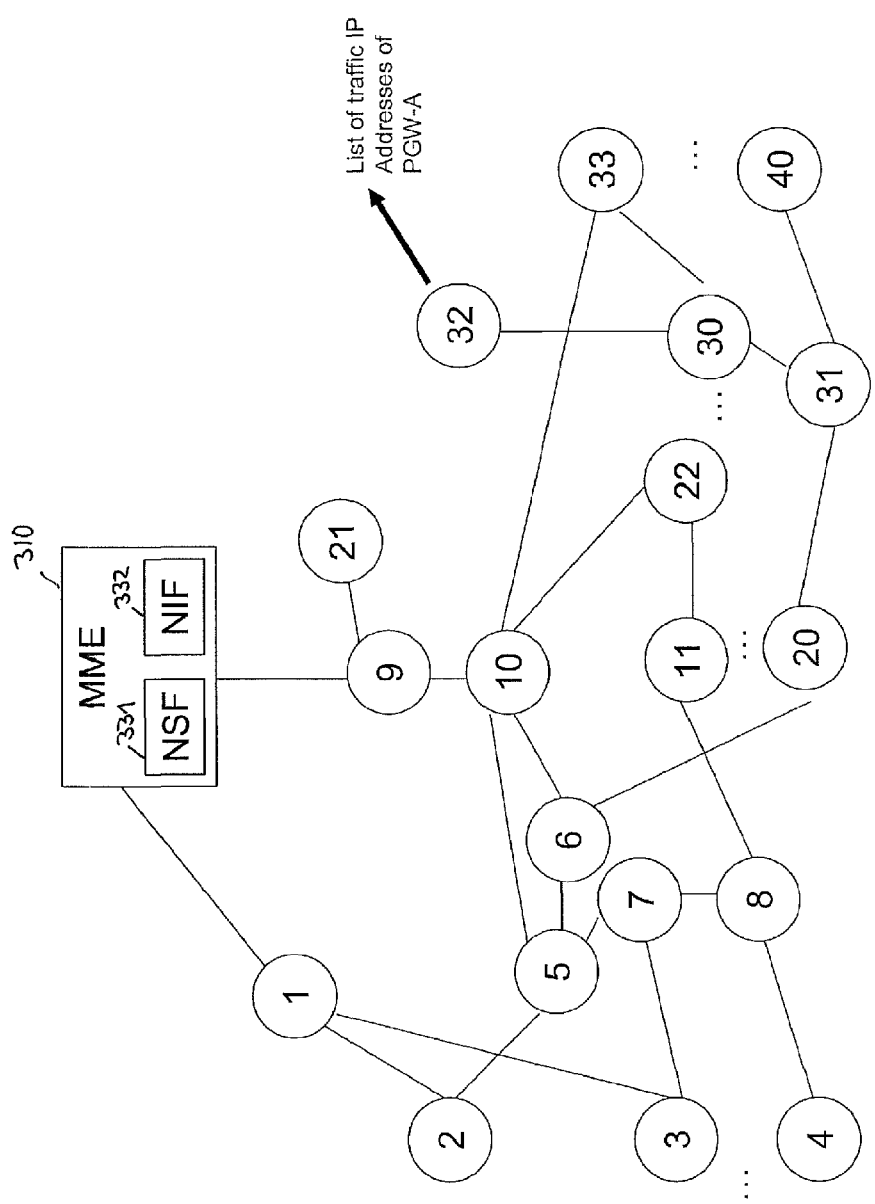
FIG. 5 schematically illustrates rooting protocol specific identifiers of predetermined network nodes of the mobile communication network shown in FIG. 5.

An example of an address mapping will now be described with respect to FIGS. 4 and 5. The SGWs and PGWs of FIG. 4 are named "SGW-A" and so on, which may be taken as a simplification of a FQDN name of the corresponding node, such as the FQDN "gw7.region7.west.vfe.mycom".

On the other hand, the NIF uses a e.g. a link state routing protocol like OSPF to obtain a link state database, which can be equivalent to a graph representing a network. FIG. 5 shows a simplified abstract representation of such a database corresponding to the network of FIG. 4. For illustration purposes, simple numbers are used as identifiers for the nodes of the networks. They represent the OSPF router-IDs mentioned above. As an example, the number "10" may be a simplification of an identifier like "117.24.12.23". Note that " . . . " in the Figure denotes omitted parts of the network that may also be included in the link state database. Other nodes, for example nodes of the S1-MME and the S11 networks (e.g. nodes 1, 9 and 21) may be omitted from the database. These nodes generally do not participate in user data transport. This may be achieved by appropriately configuring the OSPF processes, yet such an optimization is optional. The database may for example include weight, capacity and performance information for the connections (links) shown as solid black lines in FIG. 5, IP addresses of name interfaces and other information.

In a conventional EPS deployment, routing protocols for IP traffic routing purposes may be used in some of the nodes shown in FIG. 4, yet they are generally limited to each specific sub network (cloud). An SGW may thus only obtain a network view of the S1-U network and a different one for the S5/S8 network, whereas the MMA may only get a view of the S1-MMA network and a different one for the S11 network, but no information at all about the S1-U or S5/S8 networks.

With the deployment of OSPF processes in all impacted nodes in the present example, the NIF at the MME has access to a link state database that includes at least the S1-U and S5/S8 networks.

The link state database can thus store transport efficiency information for the connections involved in transporting user data. Although these connections are represented as links of an OSPF protocol in FIGS. 4 and 5, the transport efficiency information may refer to other types of connections in other embodiments, such as "tunnels" connecting two network nodes or the like. In such a configuration, an "overlay" network may be used, in which not all the router nodes shown in FIGS. 4 and 5 are included, and in which the nodes relevant for the selection optimization are connected peer to peer via these tunnels. Transport efficiency information that the routing protocol, e.g. OSPF, may collect include the speed or bandwidth of the connection, the load of the connection, a congestion that may occur at the connection and the like. With a traffic engineering extension, such as OSPF-TE, other dynamic properties such as maximum reservable bandwidth, unreserved bandwidth and available bandwidth may be communicated via link state advertisements in the network and stored in the link state database.

The EPS specific identifiers used by the NSF (the simplified "FQDNs" shown in FIG. 4) can be mapped to the routing protocol specific identifiers available to the NIF (the simplified router-IDs shown in FIG. 5) in order to enable the NSF to use the information on transport efficiency provided by the NIF. According to the two examples mentioned above, the mapping may be performed as follows:

The routing protocol employed by the NIF can use an extension carrying the FQDNs, i.e. it may carry the names like "SGW-A", . . . in the link state information that is exchanged. As a result, the network nodes shown in FIG. 5 would include not only the numerical identifiers, but also additional FQDN-like identifiers. This does not need to be the case for all circles, the additional identifiers may only be provided for predetermined network nodes.

In the other example, the routing protocol does not carry any additional identifiers, and the NSF uses the DNS for performing the FQDN mapping. The DNS may translate the FQDNs like "SGW-A" into the routing protocol specific identifiers, such as "10" in the example illustrated in FIGS. 4 and 5. This has the advantage that no rooting protocol extensions are required. Additional DNS records may be provided for this purpose.

With the rooting protocol deployed in the above described manner and by performing the address mapping, the MME has now transport efficiency information available based on which it can perform an optimized node selection. In order to select an SGW and an PGW, the MME can first employ an DNS procedure to get a list of candidate nodes. These may be the nodes fulfilling constraints as those described above, or nodes that provide a support for a specific protocol, such as the GPRS Tunnelling Protocol (GTP) or the Proxy Mobile IP (PMIP) protocol. The MME then uses the transport efficiency information of the database and possibly other criteria to select specific nodes from the lists of candidate nodes. For this purpose, the NIF can provide the NSF with a mathematical representation of the IP infrastructure connecting the candidate network nodes and other relevant nodes (such as the eNodeB currently serving the mobile device for the present example for an IPS network). The NSF then uses this information to make an optimal node selection. The selection process involves both the constraints for generating the candidate lists as well as the additional information provided by the NIF. Information that may further be employed in the node selection comprise a weighting of network nodes according to a preference, the capacity of a network node for processing traffic, and the like. Such information can also be provided at the MME.

For node selection, the MME can determine the shortest or the fastest path to the destination. The path may be determined from the eNodeB providing connectivity to the mobile device to the destination network or destination network node. Plural PGWs may be available for accessing the destination network or network node. Besides path lengths, the transport efficiency information can have information available for specifying further constraints, such as the routing over links with certain attributes. As an example, the available bandwidth may be considered to avoid congestion, so that the shortest path with available bandwidth will be chosen. The path can be determined by assigning costs corresponding to the transport efficiency information to be considered to the connections or links and employing a search method for determining the path minimizing the costs. As an example, the Dijkstra algorithm may be used for finding the shortest path.

The SGW and the PGW included in the determined path can then be selected by the MME 310 to handle the connection for the mobile device 306.

An extension can be made to cases for foreign users using foreign PGWs. The routing processes may then additionally comprise routing entries/link state advertisements owned by the points of interconnection to the GPRS Roaming Exchange (GRX) or other roaming partners, which are pointing to the traffic IP addresses of foreign PWGs (usually one or several ranges of IP addresses). The NSF and the NIF in the MME can then use a slightly different procedure as described above for foreign PGWs (the MME does not always know if the PGW is in the home mobile communication network or not), the NSF and NIF may not use the "NIF-identity.<eps-node-name>" FQDN, but the actual traffic IP address(es) of the PGW. Because the network graph maintained by the NIF may only include nodes of the home network, the foreign PGW can not be matched to specific node in the network graph maintained by the NIF, but it can be matched to those border nodes connecting to the corresponding roaming partner or GRX (border gateways).

By using this mechanism, it is therefore possible to implement a SGW and PGW node selection optimizing the traffic path between eNodeB, selected SGW, and border gateway routing the traffic to the GRX roaming partner.

In some cases, some eNodeB products may not have the required support for the routing protocol chosen for the NIF, or the operator may not want to use routing protocols on those nodes for other reasons, such as security reasons. Examples include shared eNodeBs in shared networks. In such a case, an approach similar to the one used for foreign PGWs can be employed. The eNodeB would then not be part of the network graph. Instant, the closest IP infrastructure nodes connected to such an eNodeB would be configured to announce a route towards the eNodeB. The MME may then not try to find the eNodeB in the network graph as a node with its router-ID, but rather a border node in the graph announcing the lowest cost/metric connectivity to the eNodeB.

Figure 6:
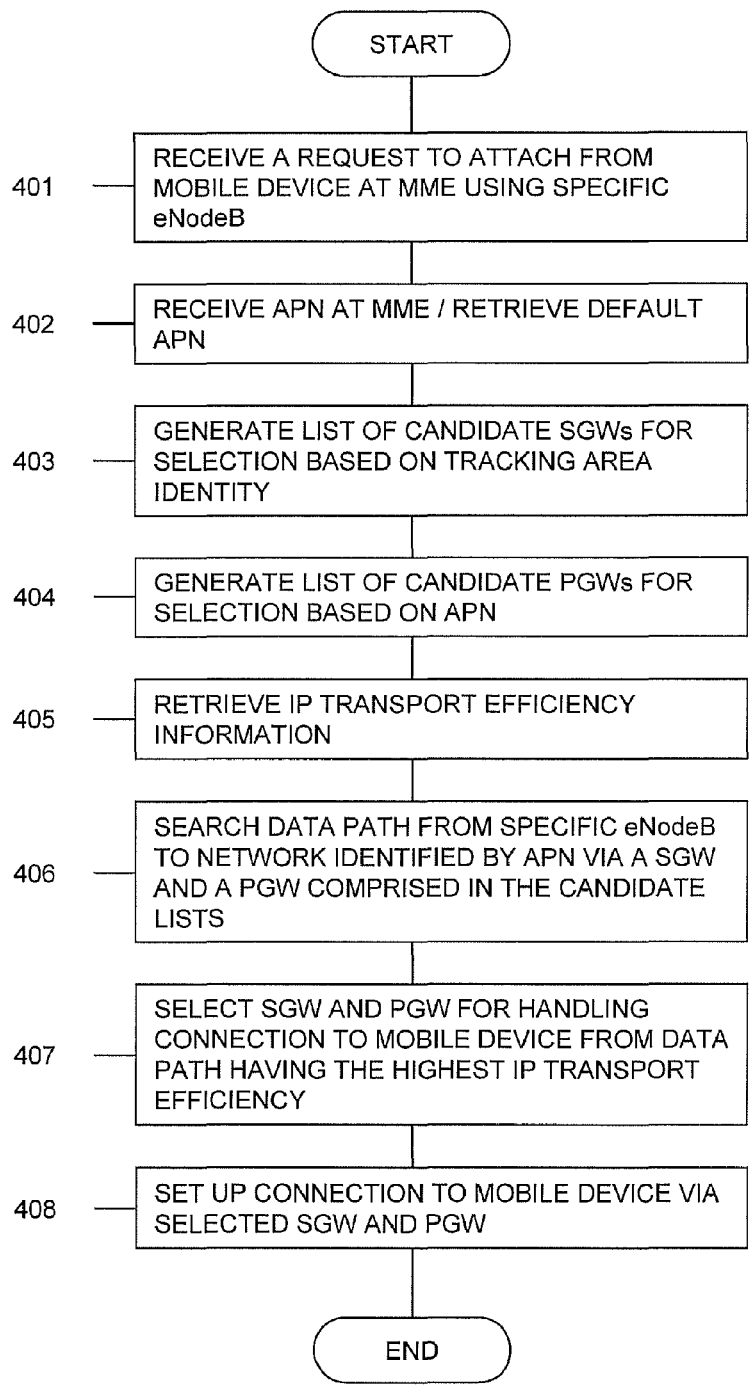
FIG. 6 shows a flow-diagram of a method according to an embodiment of the invention that may be performed in the network configuration shown in FIG. 4.
Figure 7:
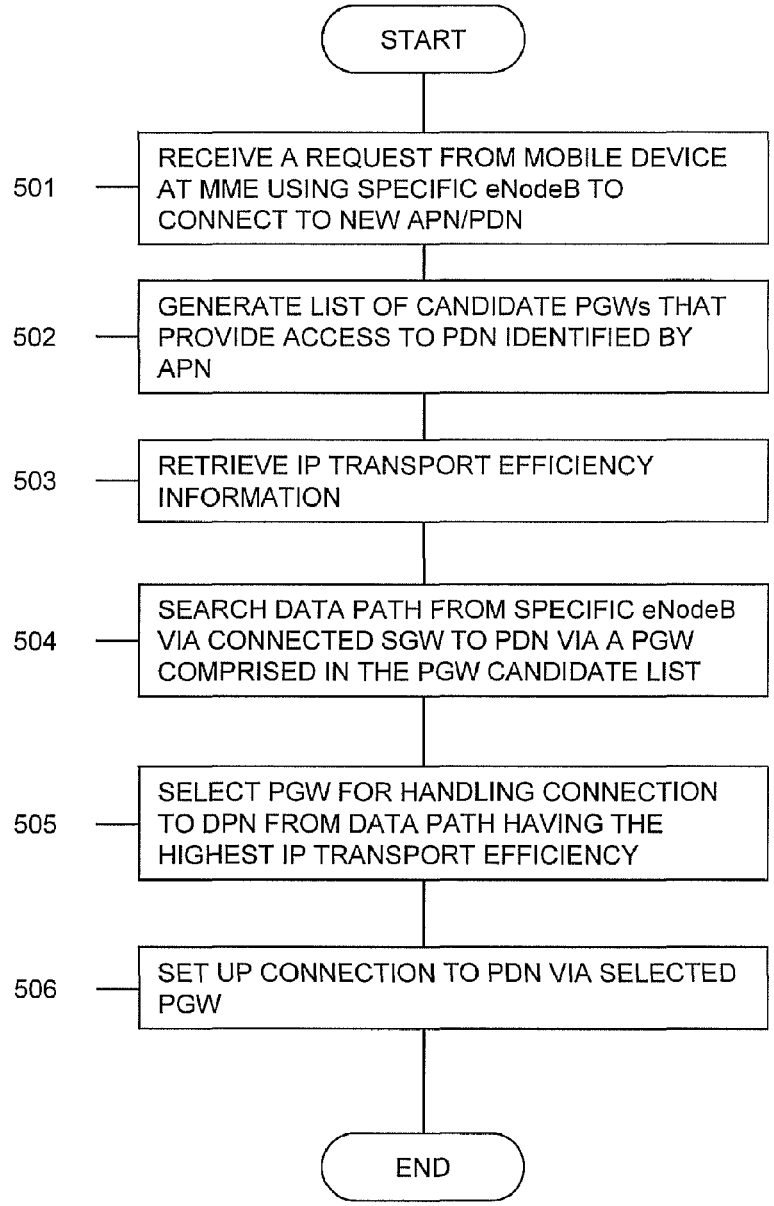
FIG. 7 shows a flow-diagram of a method according to another embodiment of the invention that may be performed in the network configuration shown in FIG. 4.
Figure 8:
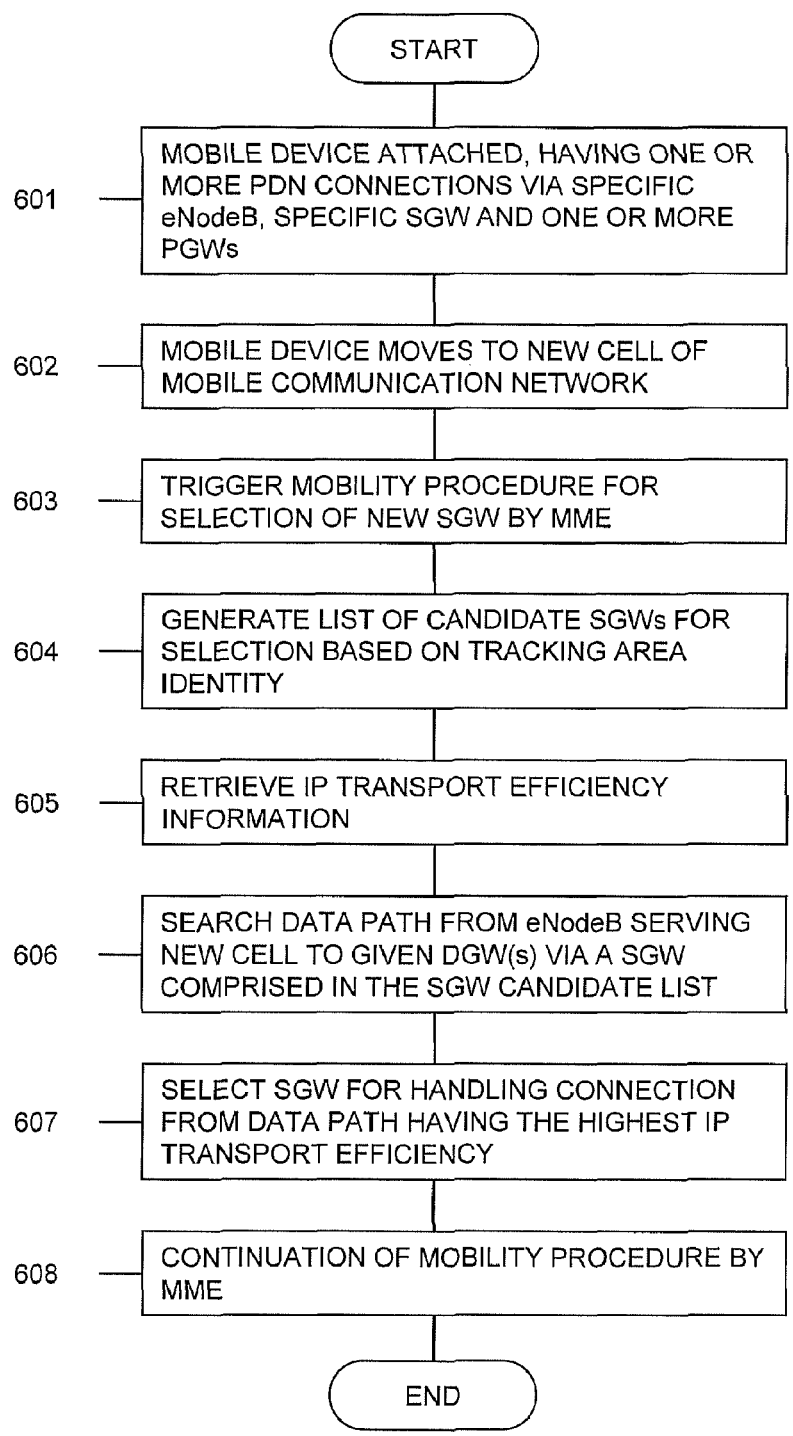
FIG. 8 shows a flow-diagram of a method according to an embodiment of the invention that may be performed in the network configuration shown in FIG. 4.

With respect to FIGS. 6, 7, and 8, three exemplary use cases of node selection are described for an EPS network as the one shown in FIG. 4. Again, it should be noted that although these examples given with respect to an EPS network, the described concepts are similarly applicable to other network types, such as GSM/GPRS, WCDMA, CDMA, and TETRA networks, nor does it prevent the usage in inter-RAT procedures between EPS and legacy GSM/WCDMA networks. The methods described with respect to FIGS. 6 to 9 may be carried out by a control node such as the MME 310 shown in FIG. 4.

With respect to FIG. 6, an Evolved Universal Terrestrial Radio Access Network (EUTRAN) initial attach procedure is described, which employs the node selection procedure according to the present embodiment.

In step 401, a request to attach is received from a mobile device at the MME using a specific eNodeB (eNodeB 315 closest to mobile device 306 in the example of FIG. 4). The request may include an APN identifying an external network, and if not, the MME may retrieve a default APN based on Home Subscriber Server (HSS) information (step 402). Based on the tracking area identity where the mobile device is located, a list of candidate SGWs that can be selected for the new connection is generated in step 403. The MME further uses the information of the APN to get a list of candidate PGWs that can be selected for the new connection (step 404). Details on the generation of candidate lists can be found in the technical specification TS 29.303.

In step 405, IP transport efficiency information is retrieved by the MME, e.g. making use of a link state database. The eNodeB serving the cell in which the mobile device is located is already given. The MME now searches a data path from the specific eNodeB to the destination network identified by the APN via an SGW and an PGW comprised in the respective candidate lists (step 406). The PGW and the SGW comprised in the data path identified in step 406 are then selected by the MME for handling the connection to the mobile device in step 407. This may for example be the data path having the highest IP transport efficiency. In step 408, the connection to the mobile device is set up via the selected SGW and PGW. Details on connection setup can be taken from TS 23.401, section 5.3.2.1.

FIG. 7 illustrates the case where a mobile device request connectivity towards a particular PDN. In step 501, the MME receives a request from an already attached mobile device via an specific eNodeB to connect to a new APN identifying a PGN. As described above, the MME uses the information of the APN to generate a list of candidate PGWs that can be selected for the new connection (step 502). In this case, the constraint for generating the candidate list is that the PGW needs to provide a connection to the PGN identified by the APN. In step 503, the MME retrieves IP transport efficiency information.

Again, the eNodeB is already given. Further, as the mobile device is already connected, the SGW is already given. According to 3GPP, the SGW should be the same as for the existing connection created at attach. The MME now searches a data path from the given eNodeB via the given SGW to the destination PDN via a PGW comprised in the PGW candidate list (step 504). The PGW comprised in the data path having the highest IP transport efficiency is then selected for handling the connection in step 505. The MME then sets up the connection in step 506 (described in detail by TS 23.401, section 5.10.2).

The example of FIG. 8 illustrates a mobility procedure with an SGW change. There are several mobility procedures, like tracking area update and handover, where for one or several PND connections (e.g. one eNodeB, one SGW, one or several PGWs), a new SGW can be selected. Such a selection is described with respect to FIG. 8.

In step 601, the mobile device is attached and has one or more PDN connections via a specific eNodeB, a specific SGW and one or more PGWs. In step 602, the mobile device moves to a new cell of the mobile communication network. In step 603, a mobility procedure is triggered that allows the selection of a new SGW by the MME.

The MME now uses information on the Tracking Area Identity (TAI) to which the mobile device has moved to get a list of candidate SGWs that can be selected for the new connection (step 604). In the present example, the eNodeB of the new cell is already given, as well as the PGWs for the existing connections. In step 605, the MME retrieves IP transport efficiency information. Based on the IP transport efficiency information, the MME searches a data path from the given eNodeB to the given PGW(s) via an SGW comprised in the SGW candidate list in step 606. The SGW comprised in the data path having the highest IP transport efficiency is then selected for handling the connection in step 607. In step 608, the mobility procedure is then continued by the MME, which may trigger the change of the SGW if decided to change it. Such an SGW change is described in detail in TS 23.401, section 5.3.3.1, and others.

Figure 9:
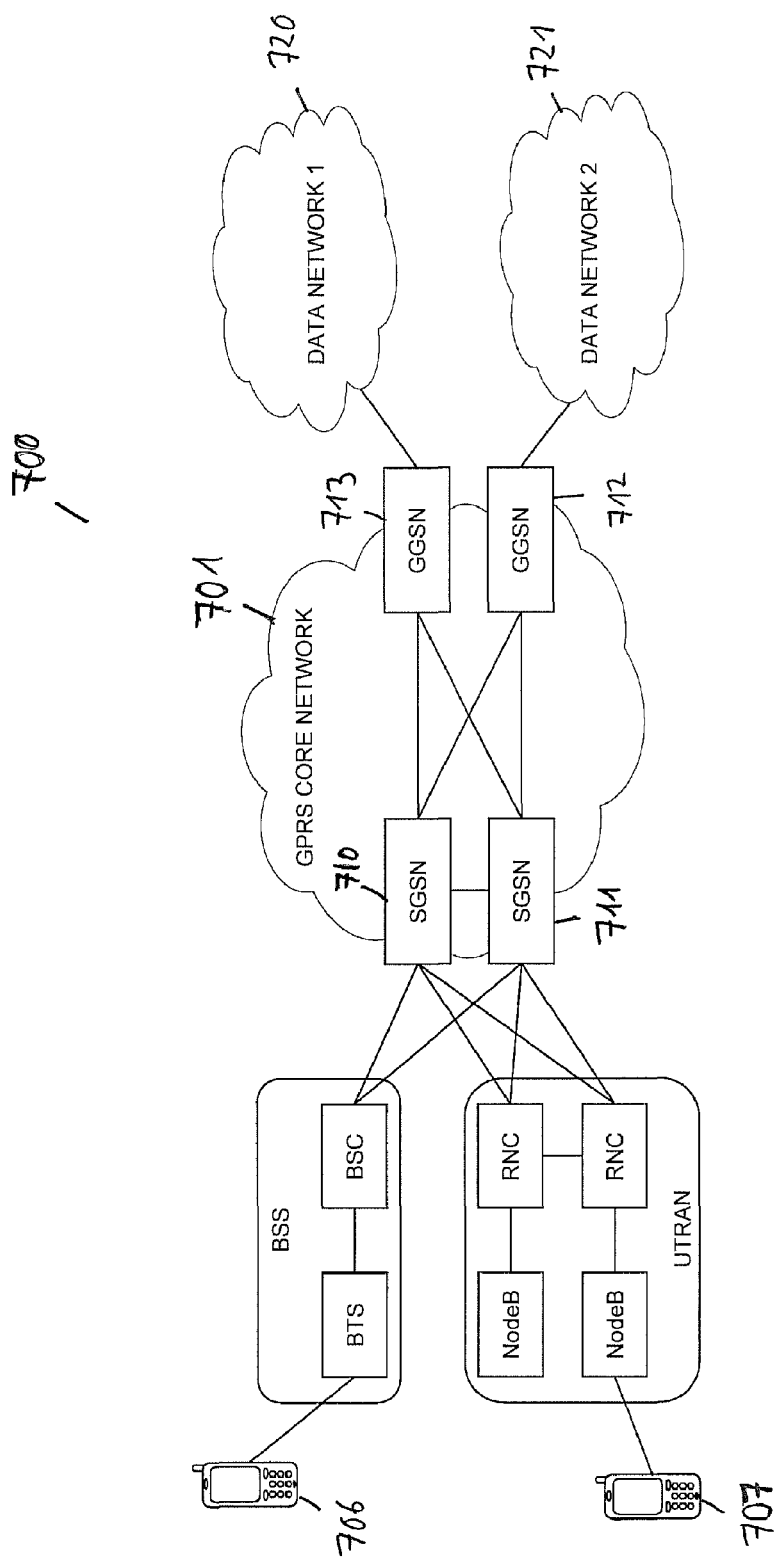
FIG. 9 schematically illustrates an GPRS core network comprising a control node in form of an SGSN according to another embodiment of the invention.

FIG. 9 illustrates another embodiment of the invention. In the example of FIG. 9, the mobile communication network 700 comprises a GPRS core network 701. Core network 701 comprises core network interface nodes in form of SGSNs 710 and 711 and GGSNs 712 and 713. GGSNs 712 and 713 provide interfaces towards the data networks 721 and 720, respectively. For providing connectivity towards the mobile devices 706 and 707, an BSS comprising an BTS and a BSC as well as a UTRAN comprising nodeBs and RNCs are illustrated in FIG. 9. Other radio access networks may also be employed for providing connectivity to mobile devices. The SGSN combines an interface node with a control node. Mobile device 707 may for example send a request to connect to a particular data network via a specific nodeB and a specific RNC to SGSN 711. There may be several GGSNs that are capable of providing a connection to the requested data network. As described above with respect to the EPS network, the SGSN may generate a candidate list of GGSNs that are capable of providing the requested connection, and may then select a particular GGSN based on retrieved transport efficiency information provided at the SGSN. Similarly, the SGSN may determine that another SGSN, e.g. SGSN 710, may be more efficient in handling the connection and may initiate a handover procedure. As can be seen, the explanations given above with respect to the EPS network can be similarly applied to the network 700 of FIG. 9 with the necessary modifications, or to other types of mobile communication networks.

Further, it should be noted that these networks may be interconnected. As an example, an SGSN may communicate with an MME over an S3 interface, and with an SGW over an S4 interface. The invention is similarly applicable to those types of interconnected networks.

The inventive method and the inventive control node can maximize the efficiency of IP transport in a mobile communication network for a connection of a mobile device. By employing the routing protocol for collecting transport efficiency information, the node selection dynamically adapts to network changes, failures and the like. Different types of traffic engineering extensions to IP routing protocols can be leveraged to add new criteria to core network node selection. As an example, traffic engineering extensions addressing link congestions or link load issues can also be used to optimize the node selection based on link congestion/load. Traffic engineering extensions to convey optical transports specific constraints may also be used to optimize node selection when using an optical transport network.

The solution further puts much lower requirements on DNS provisioning than the topon mechanism conventionally employed, and does further not require the complex mapping of an IP network weighted graph into a tree structure. As existing IP routing protocols may be reused, several advantages can be achieved. Even though different types of relevant network nodes, such as SGWs, PGWs, or even IP routing intermediate nodes, may be involved, no new requirements are put on these nodes other than IP routing support for specific protocols. Furthermore, stable and error-free implementations of such routing protocols are available. As the routing protocols that are employed can steer exactly the same traffic, the efficiency of which the NSF is trying to optimize, an enhanced node selection is obtained. By updating the routing protocol employed, future routing protocols may be used, making the invention future proof.

The invention claimed is:

1. A method of selecting an interface node of a core network of a mobile communication network for handling data traffic between a mobile device and a destination network or a destination network node, the mobile communication network comprising a plurality of core network interface nodes providing an interface to the core network and at least one control node processing signalling traffic for the mobile device, the selection being performed by the control node, the method comprising:
   retrieving transport efficiency information stored at the control node, the transport efficiency information indicating the efficiency of a transport of data traffic on connections between predetermined network nodes of the mobile communication network;
   based on the transport efficiency information, selecting at least one core network interface node from said plurality of core network interface nodes for handling the data traffic for the mobile device;
   dynamically collecting and maintaining, by the control node, the transport efficiency information according to a routing protocol employed by the control node;
   wherein selecting at least one core network interface node comprises selecting at least one core network interface node by a node selection function of the control node using a first type of network node identifier for identifying the interface nodes, and wherein retrieving the transport efficiency information comprises retrieving the transport efficiency information by a network information function using a second type of network node identifier for identifying the interface nodes, the method further comprising correlating the first and the second types of network node identifiers to enable the node selection function to use said transport efficiency information for selecting the interface node.

2. The method according to claim 1, wherein selecting at least one interface node comprises:
  determining a data path from an access node of the mobile communication network providing connectivity to the mobile device to the destination network or destination network node, respectively, having a maximum transport efficiency for said data traffic, the data path comprising at least one core network interface node; and
  selecting the at least one core network interface node comprised in the determined data path for handling the data traffic for the mobile device.

3. The method according to claim 1, wherein the selected interface node establishes a connection towards the mobile device upon selection and continues to handle data traffic for the mobile device until the connection is terminated.

4. The method according to claim 1, wherein the routing protocol comprises a dedicated routing protocol dedicated to the collection of said transport efficiency information.

5. The method according to claim 1, wherein the mobile communication network comprises a plurality of access nodes providing connectivity to the mobile device, and wherein the plurality of core network interface nodes form one or more access interface nodes providing an interface towards said access nodes and one or more gateway nodes providing an interface towards remote networks or remote network nodes, the routing protocol being operated on said access nodes, said access interface nodes, said gateway nodes, and said control node, and said network nodes operating said routing protocol being comprised in the same network area or the same virtual network of said routing protocol.

6. The method according to claim 1, wherein the transport efficiency information comprises at least one of:
  connection speed;
  connection bandwidth;
  connection congestion;
  connection load;
  maximum reservable connection bandwidth;
  unreserved connection bandwidth;
  available connection bandwidth; and
  optical-transport specific constraints for a connection.

7. The method according to claim 1, further comprising:
  from said plurality of core network interface nodes of the mobile communication network, choosing a number of core network interface nodes in accordance with predetermined constraints to generate a candidate list of core network interface nodes,
  wherein selecting at least one core network interface node comprises selecting one or more of the core network interface nodes for handling the data traffic for the mobile device from said candidate list.

8. The method according to claim 1, wherein selecting at least one core network interface node comprises selecting at least one core network interface node in response to at least one of:
  an attachment request by said mobile device;
  the mobile device moving to a new cell of the mobile communication network thereby triggering a procedure for a selection of a new core network interface node at the control node;
  the mobile device requesting a connection to a different destination network or destination network node accessible via one or more core network interface nodes different form the core network interface nodes currently connected to the mobile device; and
  an area update request from a mobile device.

9. The method according to claim 1, wherein the control node comprises a mobility management entity and the mobile communication network comprises an evolved packet system network comprising a plurality of eNodeBs as access nodes providing connectivity to the mobile device, and the plurality of core network interface nodes comprise serving gateways and packet data network gateways.

10. A control node for selecting an interface node of a core network of a mobile communication network for handling data traffic between a mobile device and a destination network or a destination network node, the mobile communication network comprising a plurality of core network interface nodes providing an interface to the core network, the control node comprising:
  a database to store transport efficiency information indicating the efficiency of a transport of data traffic on connections between predetermined network nodes of the mobile communication network;
  a selection unit configured to select at least one core network interface node from said plurality of core network interface nodes for handling the data traffic for the mobile device based on said transport efficiency information stored in said database; and
  a routing protocol configured to dynamically collect and maintain the transport efficiency information;
  wherein the selection unit selects at least one core network interface node by selecting at least one core network interface node by a node selection function of the control node using a first type of network node identifier for identifying the interface nodes, and wherein the transport efficiency information is retrieved by a network information function using a second type of network node identifier for identifying the interface nodes, the selection unit further configured to correlate the first and the second types of network node identifiers to enable the node selection function to use said transport efficiency information to select the interface node.

11. The control node according to claim 10, wherein the control node is configured to select at least one of the core network interface nodes by:
  determining a data path from an access node of the mobile communication network providing connectivity to the mobile device to the destination network or destination network node, respectively, having a maximum transport efficiency for said data traffic, the data path comprising at least one core network interface node; and
  selecting the at least one core network interface node comprised in the determined data path for handling the data traffic for the mobile device.

12. The control node according to claim 10, wherein the mobile communication network comprises a plurality of access nodes providing connectivity to the mobile device, and wherein the plurality of core network interface nodes form one or more access interface nodes providing an interface towards said access nodes and one or more gateway nodes providing an interface towards remote networks or remote network nodes, wherein said routing protocol is further provided on said access nodes, said access interface nodes, and said gateway nodes, and wherein said network nodes being provided with said routing protocol are comprised in the same network area or the same virtual network of said routing protocol.

13. The control node according to claim 10, wherein the routing protocol comprises one of an open shortest path first (OSPF) protocol, an intermediate system to intermediate system (IS-IS) protocol, a border gateway protocol (BGP), and a label switching protocol adapted to obtain multiprotocol label switching (MLPS) path information.

14. The control node according to claim 10, wherein the control node comprises a mobility management entity and the mobile communication network comprises an evolved packet system network comprising a plurality of eNodeBs as access nodes providing connectivity to the mobile device, and the plurality of core network interface nodes comprise serving gateways and packet data network gateways.

15. The control node according to claim 10, wherein the selection unit selects at least one of the core network interface nodes responsive to at least one of:
   an attachment request by said mobile device;
   the mobile device moving to a new cell of the mobile communication network thereby triggering a procedure for a selection of a new core network interface node at the control node;
   the mobile device requesting a connection to a different destination network or destination network node accessible via one or more core network interface nodes different form the core network interface nodes currently connected to the mobile device; and
   an area update request from a mobile device.

16. A non-transitory electronically readable computer medium storing non-transient electronically readable control information configured such that when using the electronically readable computer medium in a computer system of a control node, the control information performs a method of selecting an interface node of a core network of a mobile communication network for handling data traffic between a mobile device and a destination network or a destination network node, the mobile communication network comprising a plurality of core network interface nodes providing an interface to the core network and at least one control node processing signalling traffic for the mobile device, wherein the method comprises:
   retrieving transport efficiency information stored at the control node, the transport efficiency information indicating the efficiency of a transport of data traffic on connections between predetermined network nodes of the mobile communication network; and
   based on the transport efficiency information, selecting at least one core network interface node from said plurality of core network interface nodes for handling the data traffic for the mobile device,
   wherein the transport efficiency information is dynamically collected and maintained by the control node by means of a routing protocol employed by the control node;
   wherein selecting at least one core network interface node comprises selecting at least one core network interface node by a node selection function of the control node using a first type of network node identifier for identifying the interface nodes, and wherein retrieving the transport efficiency information comprises retrieving the transport efficiency information by a network information function using a second type of network node identifier for identifying the interface nodes, the method further comprising correlating the first and the second types of network node identifiers to enable the node selection function to use said transport efficiency information for selecting the interface node.

17. A computer program product in a non-transitory internal memory of a computer system of a control node, said computer program product comprising software code instructions for execution by the computer that are configured to cause the computer to select an interface node of a core network of a mobile communication network for handling data traffic between a mobile device and a destination network or a destination network node, the mobile communication network comprising a plurality of core network interface nodes providing an interface to the core network and at least one control node processing signalling traffic for the mobile device, the selection being performed by the control node, said instructions further configured to, when executed by the computer, to:
   retrieve transport efficiency information stored at the control node, the transport efficiency information indicating the efficiency of a transport of data traffic on connections between predetermined network nodes of the mobile communication network;
   based on the transport efficiency information, select at least one core network interface node from said plurality of core network interface nodes for handling the data traffic for the mobile device; and
   dynamically collect and maintain, by the control node, the transport efficiency information according to a routing protocol employed by the control node;
   wherein the selection of the at least one core network interface node comprises the selection of at least one core network interface node by a node selection function of the control node using a first type of network node identifier for identifying the interface nodes, and wherein the transport efficiency information is retrieved by a network information function using a second type of network node identifier for identifying the interface nodes, the instructions further configured to correlate the first and the second types of network node identifiers to enable the node selection function to use said transport efficiency information to select the interface node.

* * * * *

UNITED STATES PATENT AND TRADEMARK OFFICE
CERTIFICATE OF CORRECTION

| | | |
|---|---|---|
| PATENT NO. | : 8,804,520 B2 | Page 1 of 1 |
| APPLICATION NO. | : 13/266415 | |
| DATED | : August 12, 2014 | |
| INVENTOR(S) | : Cortes Gomez | |

It is certified that error appears in the above-identified patent and that said Letters Patent is hereby corrected as shown below:

On the title page, item (57), under "ABSTRACT", in Column 2, Line 4, delete "as well a" and insert -- as well as a --, therefor.

Signed and Sealed this
Second Day of June, 2015

Michelle K. Lee
*Director of the United States Patent and Trademark Office*